(12) United States Patent
Xu et al.

(10) Patent No.: US 10,880,878 B2
(45) Date of Patent: Dec. 29, 2020

(54) PHYSICAL DOWNLINK CONTROL CHANNEL HASH FUNCTION UPDATE

(71) Applicant: QUALCOMM Incorporated, San Diego, CA (US)

(72) Inventors: Huilin Xu, San Diego, CA (US); Heechoon Lee, San Diego, CA (US); Jing Sun, San Diego, CA (US); Alexandre Pierrot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,228

(22) Filed: Feb. 13, 2019

(65) Prior Publication Data

US 2019/0261326 A1 Aug. 22, 2019

Related U.S. Application Data

(60) Provisional application No. 62/710,307, filed on Feb. 16, 2018.

(51) Int. Cl.
*H04W 72/04* (2009.01)
*H04W 48/16* (2009.01)
*H04L 5/00* (2006.01)
*H04W 48/12* (2009.01)
*H04B 7/02* (2018.01)

(52) U.S. Cl.
CPC ......... *H04W 72/042* (2013.01); *H04L 5/0053* (2013.01); *H04L 5/0082* (2013.01); *H04W 48/16* (2013.01); *H04W 72/0446* (2013.01); *H04B 7/02* (2013.01); *H04L 5/0007* (2013.01); *H04W 48/12* (2013.01)

(58) Field of Classification Search
None
See application file for complete search history.

(56) References Cited

U.S. PATENT DOCUMENTS

| 2011/0051681 A1* | 3/2011 | Ahn | ............... H04L 5/0007 370/330 |
| 2013/0088972 A1* | 4/2013 | Kim | ............... H04L 5/001 370/241 |

FOREIGN PATENT DOCUMENTS

WO 2009116824 A1 9/2009

OTHER PUBLICATIONS

International Search Report and Written Opinion—PCT/US2019/018028—ISA/EPO—dated May 7, 2019.

(Continued)

*Primary Examiner* — Diane L Lo
(74) *Attorney, Agent, or Firm* — Qualcomm Incorporated

(57) ABSTRACT

Various aspects of the present disclosure generally relate to wireless communication. In some aspects, a user equipment may identify a hash value index associated with searching for a physical downlink control channel. The hash value index may be identified based at least in part on an index of an interval of a plurality of intervals within a periodicity. The user equipment may configure, based at least in part on the hash value index, a hash function associated with determining the hash value. Numerous other aspects are provided.

26 Claims, 11 Drawing Sheets

900

905
Identify Index of Hash Value for Hash Function associated with PDCCH Search (see Options below)

910
Configure Hash Function based at least in part on Index of Hash Value

UE

Techniques for Identifying Hash Value Index
- Index of an Interval
- Index of Search Space Set Occasion associated with a Search Space Set Index
- Index of Search Space Set Occasion associated with Plurality of Search Space Set Indices

(56) References Cited

OTHER PUBLICATIONS

Nokia et al., "On Reducing the PDCCH Channel Estimation and BD Complexity in NR", 3GPP Draft; 3GPP TSG RAN WG1 Ad Hoc 1801, R1-1800550_BD_CCE_Reduction_NOK, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 12, 2018, XP051384382, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018], Section "2.2 Revisiting the NR hashing function", 14 pages, Section 2, par. 1, 4, "Proposal #1 . . . " section 2.1, par. 1, sections 2.1.1, 2.1.2, section 2.1.3, sections 1-5, par. 1 and subsection "38.213 Text Proposal", last two paragraphs.

Qualcomm Incorporated: "Remaining Issues on Control Resource Set and Search Space", 3GPP Draft; R1-1800868_Control Resource Set and Search Space, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018 (Jan. 13, 2018), XP051385138, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018]Section "6.2 Correction on hashing", 7 pages.

\* cited by examiner

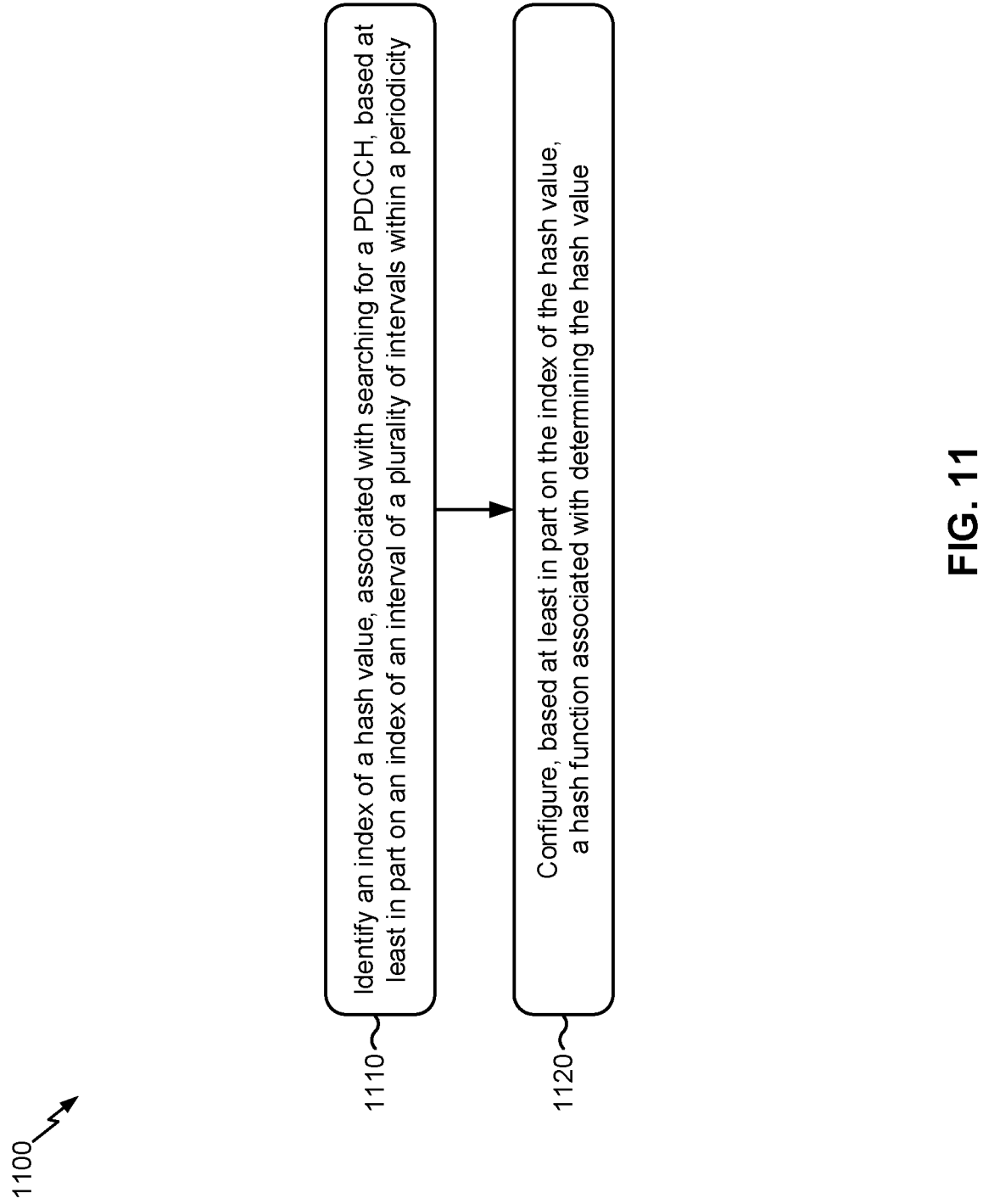

PHYSICAL DOWNLINK CONTROL CHANNEL HASH FUNCTION UPDATE

CROSS REFERENCE TO RELATED APPLICATION UNDER 35 U.S.C § 119

This application claims priority to U.S. Provisional Patent Application No. 62/710,307, filed on Feb. 16, 2018, entitled "TECHNIQUES AND APPARATUSES FOR PHYSICAL DOWNLINK CONTROL CHANNEL HASH FUNCTION UPDATE IN NEW RADIO," which is incorporated by reference herein.

TECHNICAL FIELD OF THE DISCLOSURE

Aspects of the technology described below generally relate to wireless communication, and more particularly to techniques and apparatuses for physical downlink control channel (PDCCH) hash function update. Embodiments and techniques enable and provide wireless communication devices and systems configured for flexible searching for a PDCCH.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies are desirable. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of this summary is to present some concepts of one or more aspects of the disclosure in summary form as a prelude to the more detailed description that is presented later.

In some aspects, a method of wireless communication, performed by a user equipment, may include identifying an index of a hash value associated with searching for a physical downlink control channel (PDCCH), wherein the index of the hash value is identified based at least in part on one of: an index of an interval of a plurality of intervals within a periodicity, an index of a search space set occasion, of a plurality of search space set occasions associated with a search space set index, within the periodicity, or an index of a search space set occasion, of a plurality of search space set occasions associated with a plurality of search space set indices, within the periodicity, wherein the plurality of search space set indices is associated with a control resource set index; and configuring, based at least in part on the index of the hash value, a hash function associated with determining the hash value.

In some aspects, a user equipment for wireless communication may include memory and one or more processors operatively coupled to the memory. The memory and the one or more processors may be configured to identify an index of a hash value associated with searching for a physical downlink control channel (PDCCH), wherein the index of the hash value is identified based at least in part on one of: an index of an interval of a plurality of intervals within a periodicity, an index of a search space set occasion, of a plurality of search space set occasions associated with a search space set index, within the periodicity, or an index of a search space set occasion, of a plurality of search space set occasions associated with a plurality of search space set indices, within the periodicity, wherein the plurality of search space set indices is associated with a control resource set index; and configure, based at least in part on the index of the hash value, a hash function associated with determining the hash value.

In some aspects, a non-transitory computer-readable medium may store one or more instructions for wireless communication. The one or more instructions, when executed by one or more processors of a user equipment, may cause the one or more processors to identify an index of a hash value associated with searching for a physical downlink control channel (PDCCH), wherein the index of the hash value is identified based at least in part on one of: an index of an interval of a plurality of intervals within a periodicity, an index of a search space set occasion, of a plurality of search space set occasions associated with a search space set index, within the periodicity, or an index of a search space set occasion, of a plurality of search space set occasions associated with a plurality of search space set indices, within the periodicity, wherein the plurality of search space set indices is associated with a control resource set index; and configure, based at least in part on the index of the hash value, a hash function associated with determining the hash value.

In some aspects, an apparatus for wireless communication may include means for identifying an index of a hash value associated with searching for a physical downlink control channel (PDCCH), wherein the index of the hash value is identified based at least in part on one of: an index of an interval of a plurality of intervals within a periodicity, an index of a search space set occasion, of a plurality of search space set occasions associated with a search space set index, within the periodicity, or an index of a search space set occasion, of a plurality of search space set occasions associated with a plurality of search space set indices, within the periodicity, wherein the plurality of search space set indices is associated with a control resource set index; and means for configuring, based at least in part on the index of the hash value, a hash function associated with determining the hash value.

In some aspects, a method of wireless communication, performed by a user equipment, may include identifying an index of a hash value, associated with searching for a PDCCH, based at least in part on an index of an interval of a plurality of intervals within a periodicity; and configuring, based at least in part on the index of the hash value, a hash function associated with determining the hash value.

In some aspects, a user equipment for wireless communication may include memory and one or more processors operatively coupled to the memory. The memory and the one or more processors may be configured to identify an index of a hash value, associated with searching for a PDCCH, based at least in part on an index of an interval of a plurality of intervals within a periodicity; and configure, based at least in part on the index of the hash value, a hash function associated with determining the hash value.

In some aspects, a non-transitory computer-readable medium may store one or more instructions for wireless communication. The one or more instructions, when executed by one or more processors of a user equipment, may cause the one or more processors to identify an index of a hash value, associated with searching for a PDCCH, based at least in part on an index of an interval of a plurality of intervals within a periodicity; and configure, based at least in part on the index of the hash value, a hash function associated with determining the hash value.

In some aspects, an apparatus for wireless communication may include means for identifying an index of a hash value, associated with searching for a PDCCH, based at least in part on an index of an interval of a plurality of intervals within a periodicity; and means for configuring, based at least in part on the index of the hash value, a hash function associated with determining the hash value.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a user equipment, in accordance with various aspects of the present disclosure.

DETAILED DESCRIPTION

Figure 1:
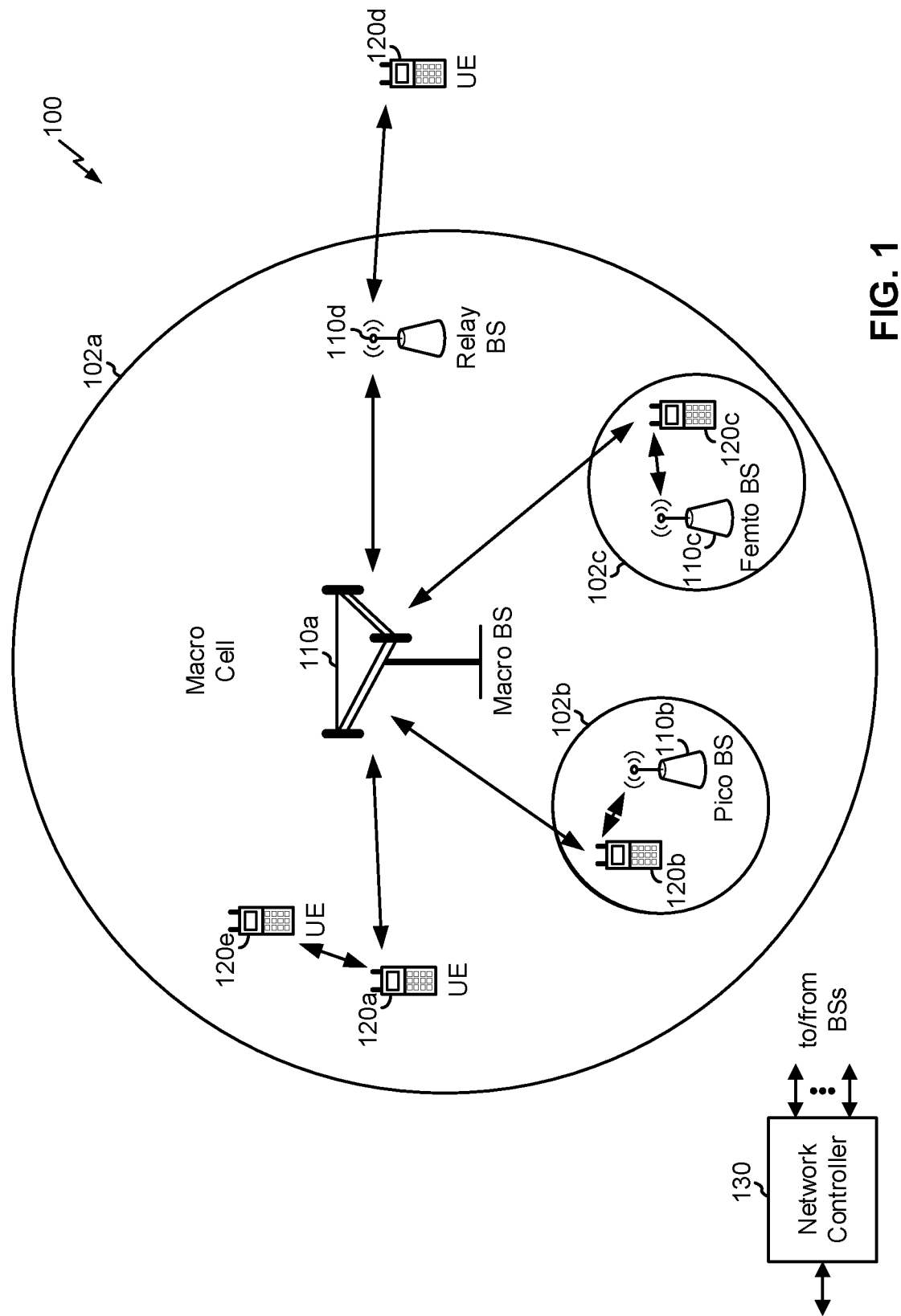
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
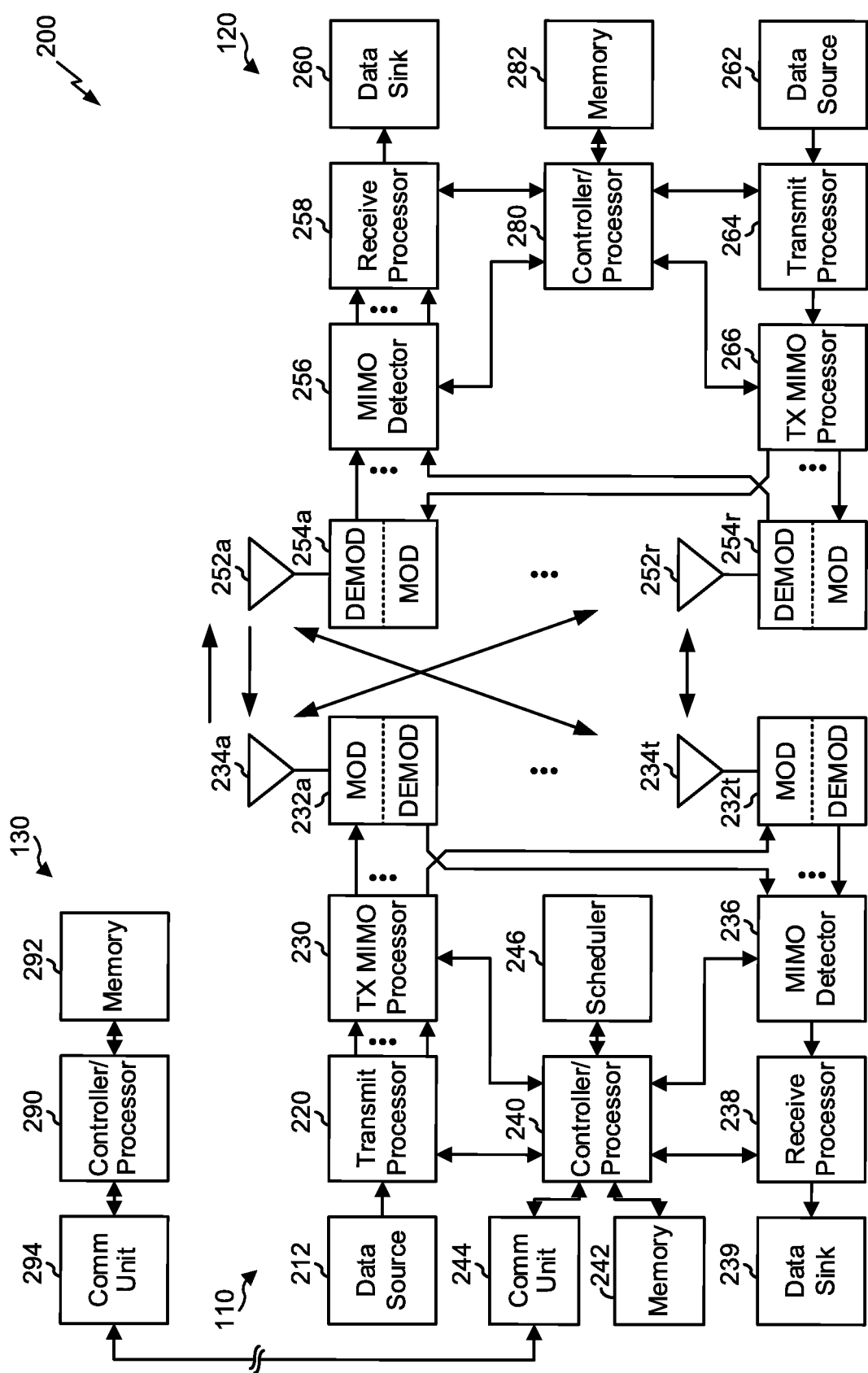
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antenna(s) 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with physical downlink control channel (PDCCH) hash function updating and/or restarting, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. Hence, memory 282 can comprise a non-transitory computer-readable medium storing one or more instructions for wireless communication that, when executed by one of more processors of the UE 120 may cause the one or more processors to perform various functions disclosed elsewhere herein, for example, functions described with reference to FIG. 10 and/or FIG. 11. Additionally or alternatively, memory 282 may receive and/or copy such instructions from a non-transitory computer-readable medium storing such one or more instructions. A scheduler 246 may schedule UEs for data transmission on the downlink and/or uplink.

In some aspects, UE 120 may include means for identifying an index of a hash value associated with searching for a PDCCH, wherein the index of the hash value is identified based at least in part on one of: an index of an interval of a plurality of intervals within a periodicity, an index of a search space set occasion, of a plurality of search space set occasions associated with a search space set index, within the periodicity, or an index of a search space set occasion, of a plurality of search space set occasions associated with a plurality of search space set indices, within the periodicity, wherein the plurality of search space set indices is associated with a control resource set index; means for configuring, based at least in part on the index of the hash value, a hash function associated with determining the hash value; and/or the like. In some aspects, such means may include one or more components of UE 120 described in connection with FIG. 2.

In some aspects, UE 120 may include means for identifying an index of a hash value, associated with searching for a PDCCH, based at least in part on an index of an interval of a plurality of intervals within a periodicity; means for configuring, based at least in part on the index of the hash value, a hash function associated with determining the hash value; and/or the like. In some aspects, UE 120 may include means for updating the hash function at another interval, of the plurality of intervals, based at least in part on an updated index of the hash value identified based at least in part on an index of the other interval. In some aspects, an interval may be defined as a set of N (N≥1) consecutive symbols. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
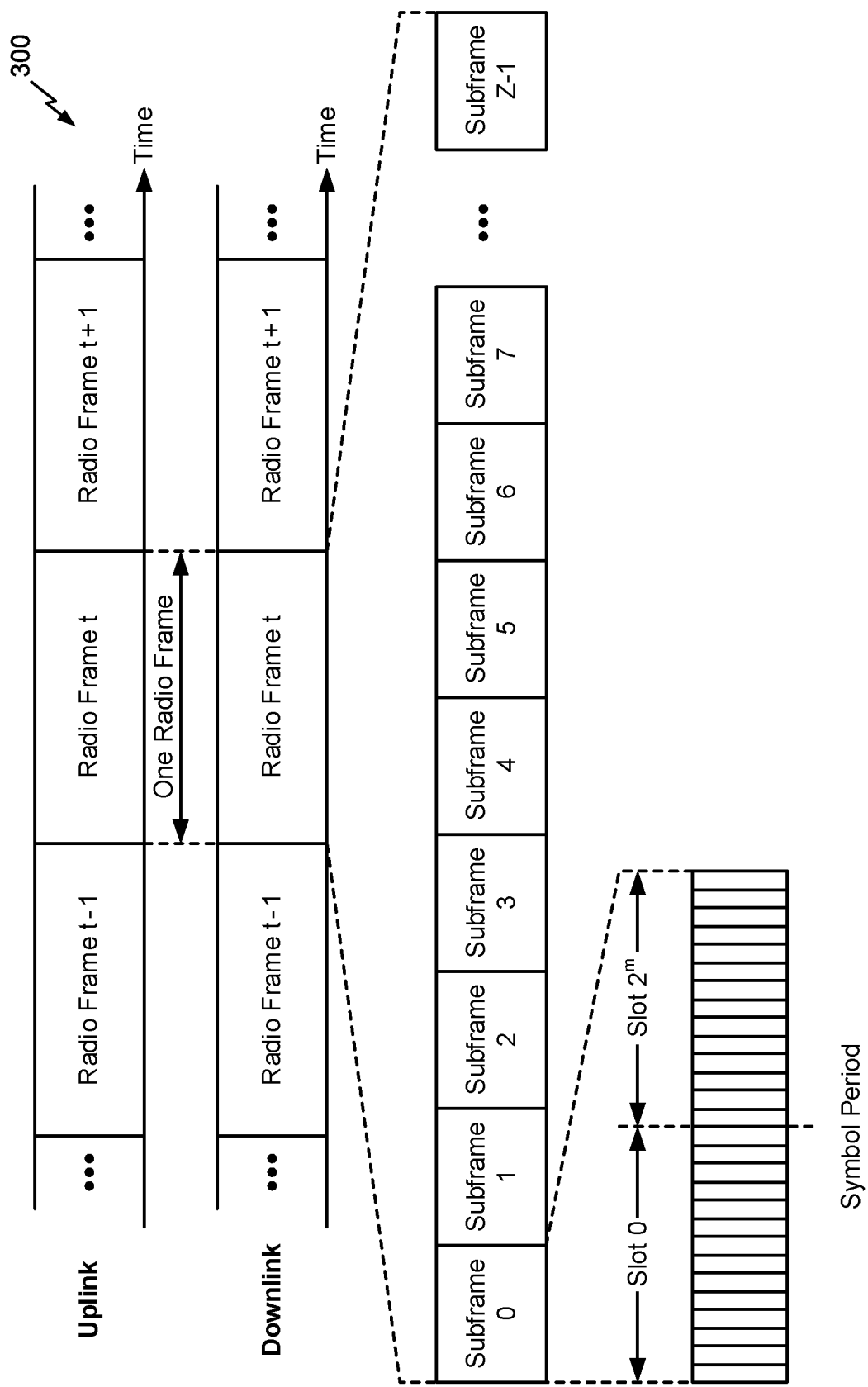
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitions into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes one slot (e.g. when m=0), the subframe may include L symbol periods, where the L symbol periods in each subframe may be assigned indices of 0 through L−1. In some aspects, a scheduling unit for FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
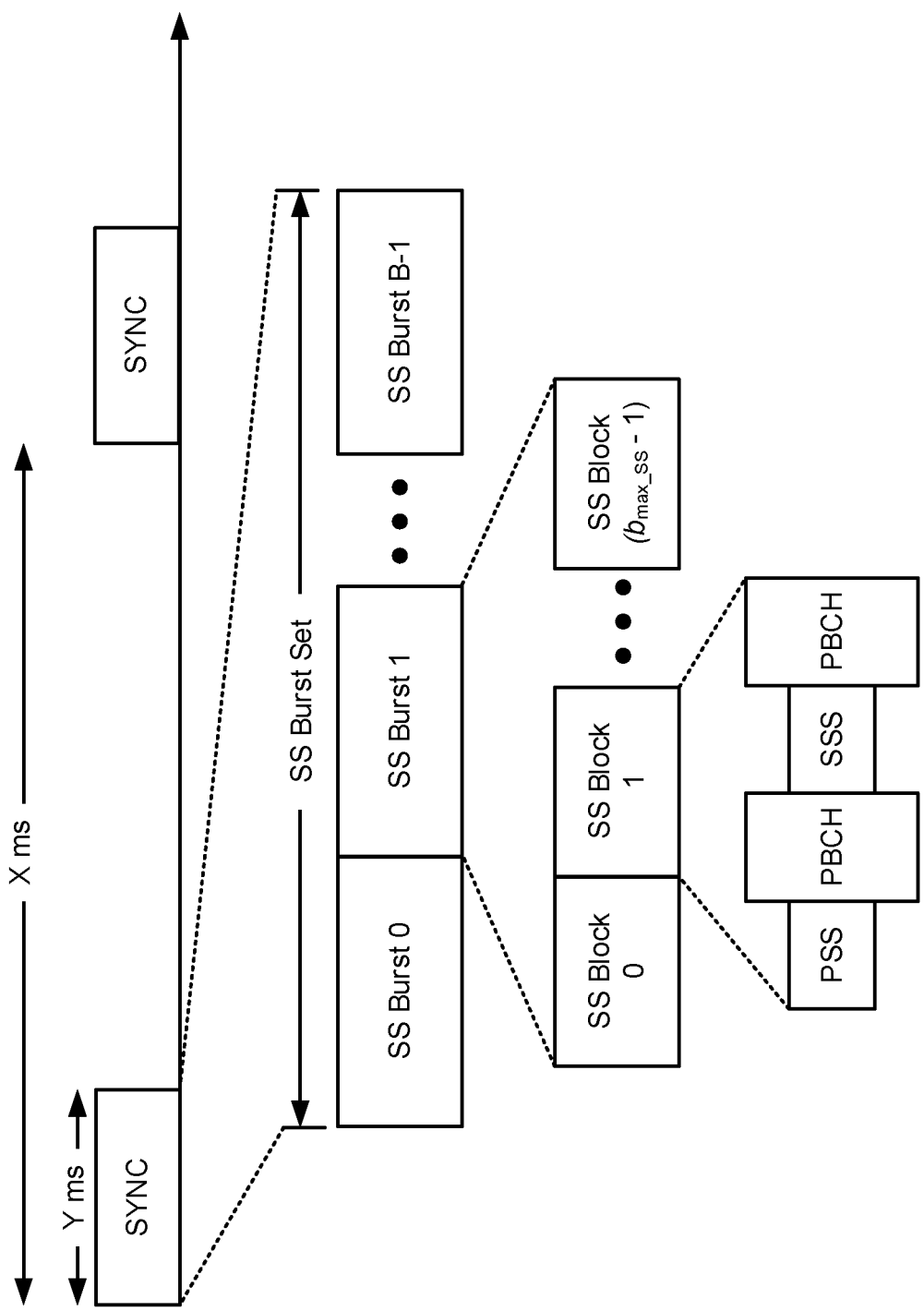
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a PDCCH in C symbol periods of a subframe, which may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
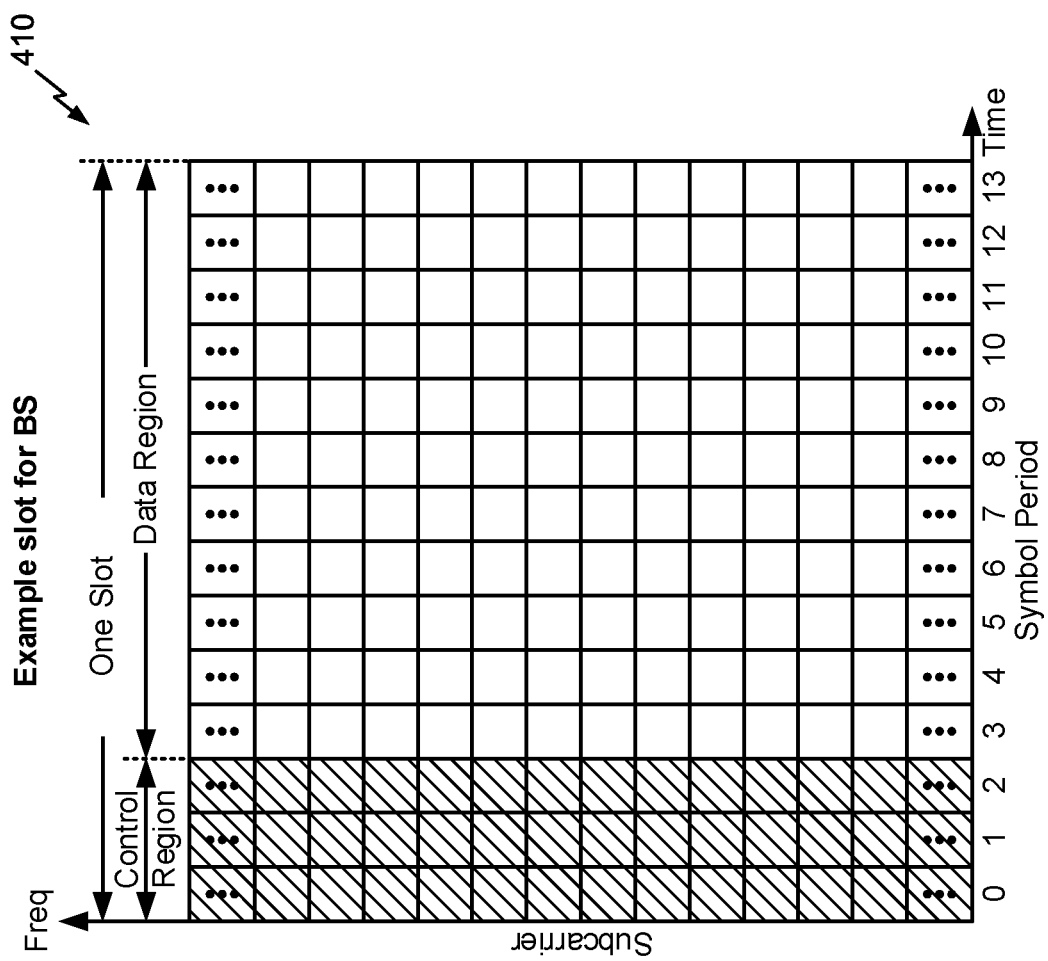
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, slot format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than orthogonal frequency-division multiple access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
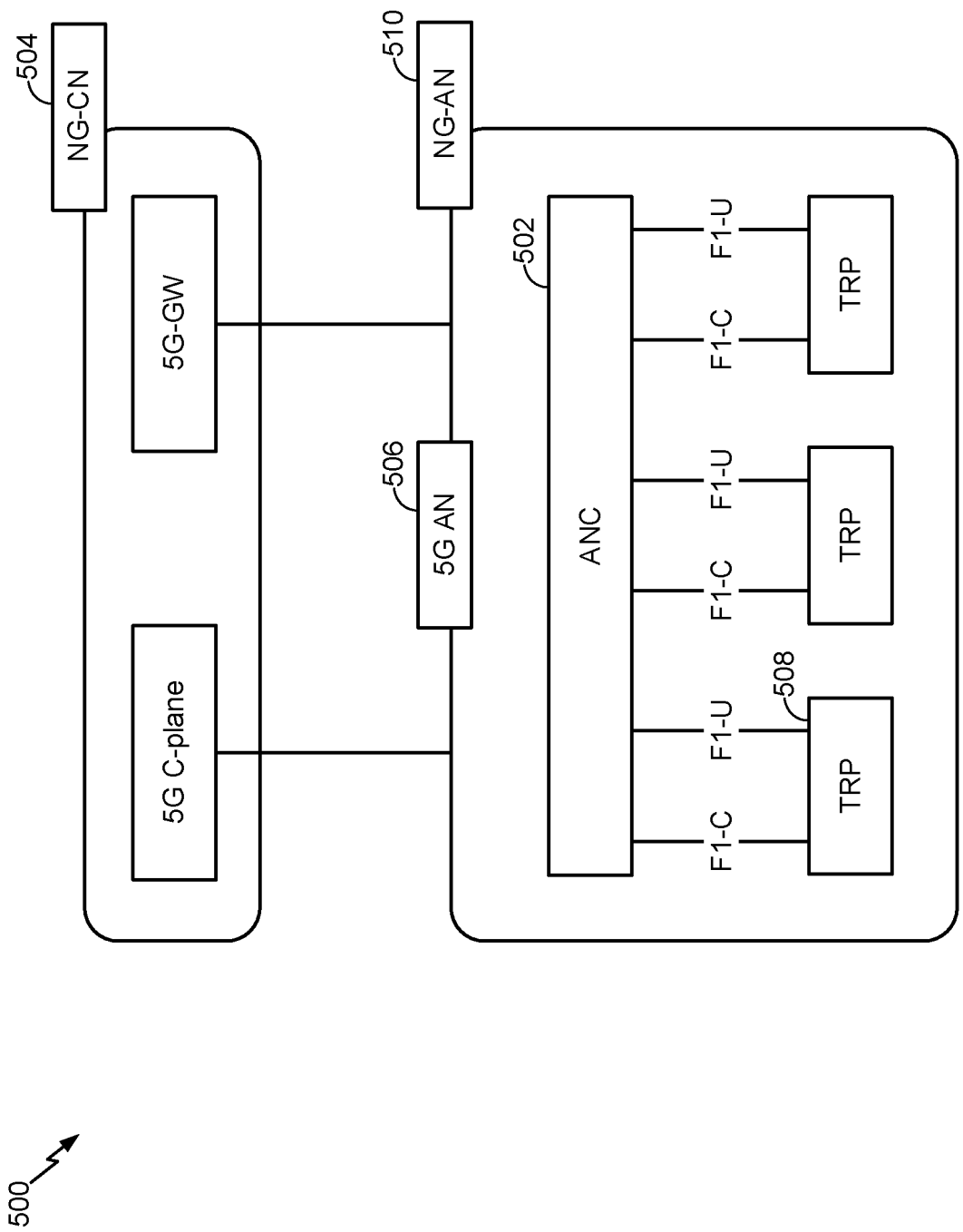
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be used/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
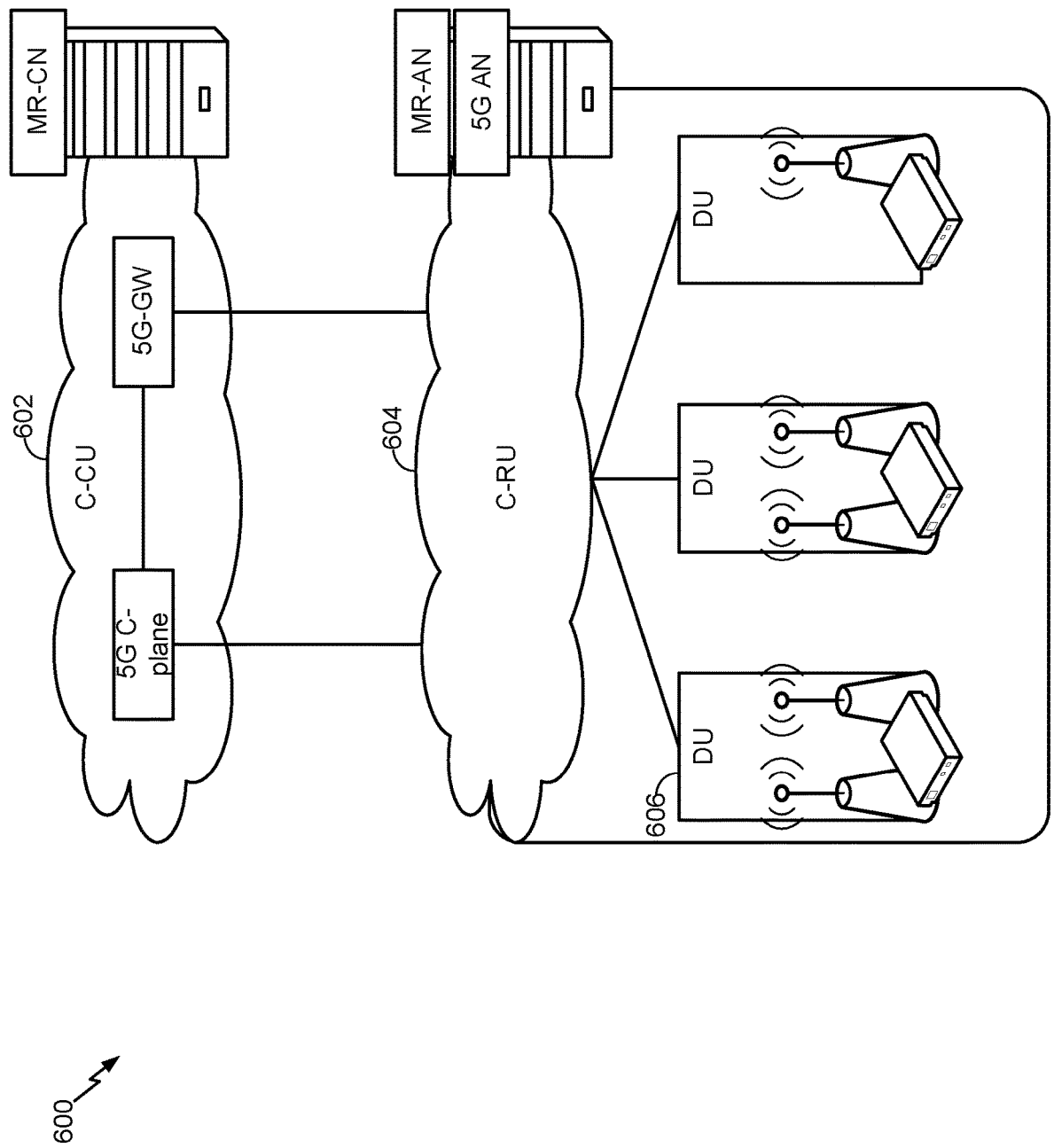
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
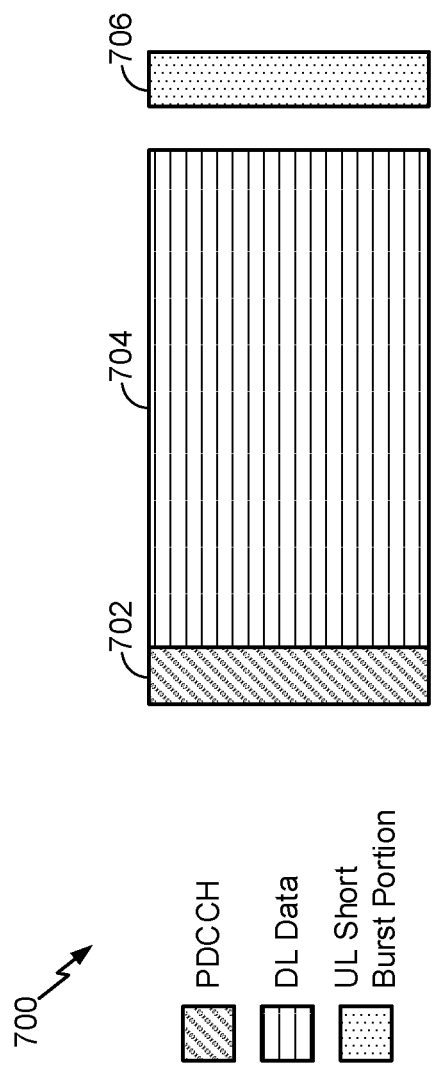
FIG. 7 is a diagram illustrating an example of a downlink (DL)-centric subframe, in accordance with various aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a PDCCH, as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a physical uplink shared channel (PUSCH) ACK, an immediate ACK, etc.), a NACK signal (e.g., a PUCCH NACK, a PUSCH NACK, an immediate NACK, etc.), a scheduling request (SR), a buffer status report (BSR), a hybrid automatic repeat request (HARD) indicator, a channel state indication (CSI), a CQI, a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
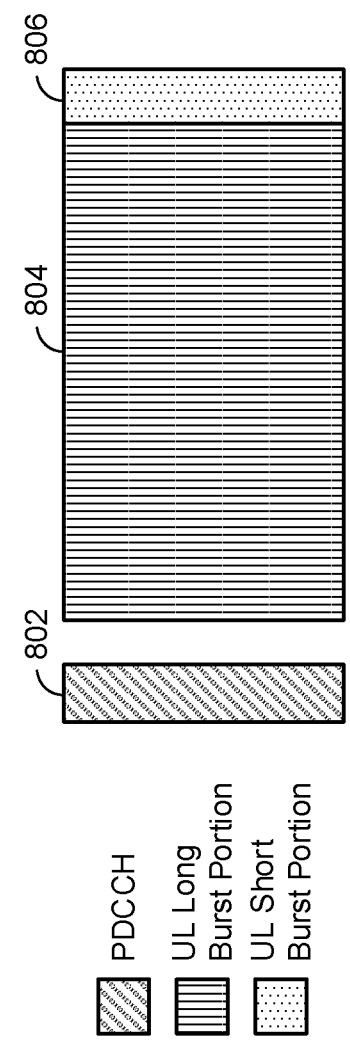
FIG. 8 is a diagram illustrating an example of an uplink (UL)-centric subframe, in accordance with various aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may include a PDCCH transmission.

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In a NR network, a base station transmits PDCCH (e.g., including control information, such as downlink control information (DCI)) based on a search space set. A given search space set defines candidates that may carry PDCCH within the search space set, where each candidate is associated with one or more groups of resource elements (herein referred to as control channel elements (CCEs)). One or more search space sets may be associated with a control resource set (CORESET). In a NR network, a base station may flexibly schedule and transmit PDCCH. In other words, transmission of PDCCH in the NR network is not limited to a particular set of frequency resources and/or time resources in a given subframe, as in the case of, for example, a LTE network.

PDCCH frequency domain resources, as well as a time duration of the PDCCH, are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set. A PDCCH location in the time domain is configured on a per search space set basis. Here, for a given search space set associated with a CORESET, the UE is configured with information that identifies a monitoring periodicity associated with the search space set (e.g., information indicating that the search space set should be monitored once every X (X≥1) slots), information that identifies a monitoring offset (e.g., information that identifies that a particular slot, of each X slots, that the UE is to monitor), and information that identifies a monitoring pattern (e.g., information that identifies the first symbol(s) of the search space set within the particular slot). Thus, the UE may be configured with information that allows the UE to identify resources of the search space set in both the frequency domain and the time domain, and the base station may transmit PDCCH in one or more candidates in the search space set.

In order to receive PDCCH carried in one or more candidates of a given UE-specific search space set (i.e., a search space set that may carry control information specific to one or more particular UEs), a UE may attempt to decode PDCCH in candidates of the search space set. However, the locations of candidates across search space sets may be varied when transmitted by the base station (e.g., in order to avoid PDCCH collisions among neighboring cells, in order to avoid patterned PDCCH transmissions, and/or the like). Thus, the UE identifies a location of a given candidate before attempting to decode PDCCH.

In some cases, the UE identifies a location of a candidate in a search space set based on determining one or more control channel element (CCE) indices that correspond to one or more CCEs associated with the candidate. Here, a given CCE index is determined partially based on a hash value ($Y_{p,k}$), where the hash value is computed based on a hash function using a hash value index (k). The hash function is designed to allow the UE to identify locations of candidates when the locations are varied across search space sets.

Generally, for a search space set in a CORESET p, a hash value $Y_{p,k}$ is computed based on the following function:

$$Y_{p,k} = (A_p \times Y_{p,k-1}) \bmod D$$

where k is the hash value index (sometimes referred to as an index of the hash value), $A_p$ is an integer corresponding to CORESET p, and D is an integer number. As indicated, a given hash value is computed partially on a hash value associated with a preceding hash value index. Typically, an integer $Y_{p,-1}$ may be used to compute an initial hash value (e.g., $Y_{p,0} = (A_p \times Y_{p,-1}) \bmod D$), and other hash values may be computed based on updating (e.g., incrementing) the hash value index. Based on computing a given hash value, the UE may determine one or more CCE indices associated with the candidate, and may attempt to decode PDCCH (e.g., using a blind decoding procedure).

In some cases, the UE may use the hash value in order to identify locations of one or more other candidates, until a point at which the UE is to update the hash function (e.g., by incrementing the hash value index and updating the hash value based on the incremented hash value index) or restart the hash function (e.g., in order to reset the hash value to an initial hash value). The UE then uses the updated hash value (when the UE updates the hash value index) or the initial hash value (when the UE restarts the hash function) for identifying locations of additional candidates, and so on.

However, a basis on which the UE identifies and/or updates the hash value index, a point at which the UE updates the hash function, and a point at which the UE restarts the hash function is complicated in a NR network due to the flexible nature of PDCCH scheduling and transmission (e.g., as compared to the comparatively static nature of PDCCH in a LTE network).

Some aspects described herein provide techniques and apparatuses for identifying a hash value index for a hash function associated with identifying a location of a candidate in which PDCCH may be received in a NR network. Further, some aspects described herein provide techniques and apparatuses for updating the hash function and/or restarting the hash function in association with PDCCH searching in the NR network.

Figure 9:
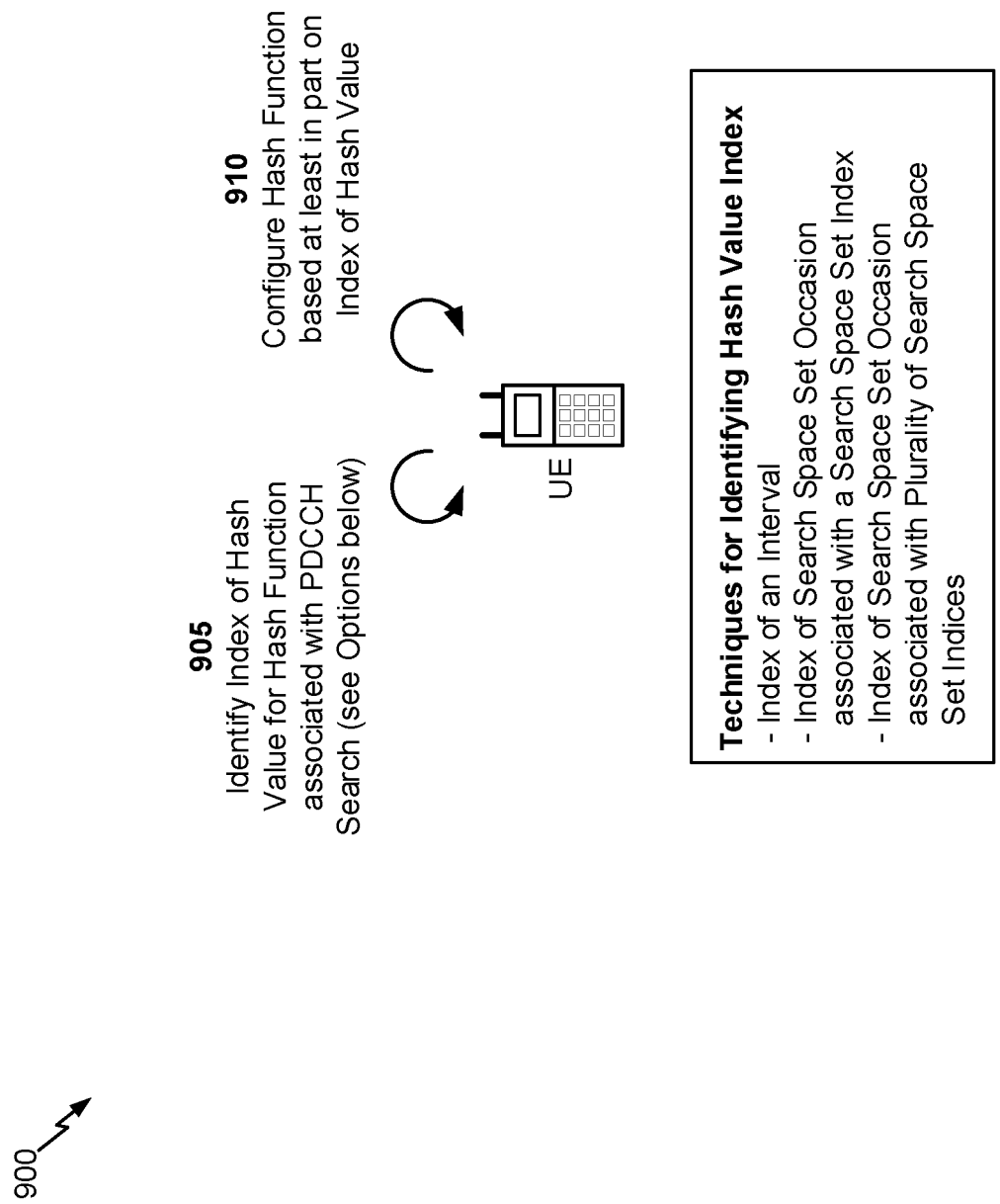
FIG. 9 is a diagram illustrating an example of identifying a hash value index for a hash function associated with identifying a location of a candidate in which PDCCH may be received, and updating the hash function and/or restarting the hash function, in accordance with various aspects of the present disclosure.

FIG. 9 is a diagram illustrating an example 900 of identifying a hash value index for a hash function associated with identifying a location of a candidate in which PDCCH may be received, and updating the hash function and/or restarting the hash function, in accordance with various aspects of the present disclosure.

As shown in FIG. 9, and by reference number 905, a UE (e.g., UE 120) may identify a hash value index associated with searching for a PDCCH. As described above, the hash value index may be associated with computing a hash value, where a location of a candidate within a search space set that may carry PDCCH, associated with the UE, may be identified based at least in part on the hash value. Example techniques (noted in FIG. 9) based at least in part on which the UE may identify the hash value index are described in further detail below.

As further shown in FIG. 9, and by reference number 910, the UE may configure a hash function, associated with determining the hash value, based at least in part on the hash value index. For example, the UE may, based at least in part on the hash value index, configure the hash function such that the hash function can be used to compute a hash value associated with identifying one or more candidate locations for PDCCH associated with the UE. In other words, based at least in part on the identified hash value index, the UE may configure the hash function such that the hash function outputs a hash value that can be used to identify a candidate location for PDCCH in a particular search space set. Particular examples of configuring the hash function are described below.

In some aspects, the UE may update the hash function (e.g., such that another hash value is computed using the hash function) based at least in part on identifying another hash value index (e.g., by incrementing the hash value index) at a particular point, examples of which are described below.

In some aspects, the UE may restart the hash function (e.g., such that the hash value is reset to an initial hash value) at a particular point, examples of which are described below.

In one example aspect, the UE may identify the hash value index based at least in part on an index of an interval of a plurality of intervals within a periodicity. Here, an interval may be defined as a set of N (N≥1) consecutive symbols, and the periodicity may be defined as a set of M (M≥1) intervals. Thus, in some aspects, the periodicity may include N×M symbols. In this example aspect, the UE may identify the hash value of index based at least in part on an index of a given interval within the periodicity.

In this example aspect, the UE may receive information that identifies a starting symbol of a first interval of a first periodicity from a network device associated with the NR network. Additionally, or alternatively, the UE may store the information that identifies the starting symbol of the first interval of the first periodicity (e.g., the starting symbol may be predefined or preconfigured on the UE). Here, the first periodicity may be an initial periodicity that starts within or after a particular frame that is known to or can be readily identified by the UE, such as system frame number 0.

Further, in this example aspect, the UE may update the hash function at each interval of the plurality of intervals. For example, the UE may identify a hash value index as an index of a particular interval of the set of M intervals, and may configure the hash function based at least in part on the hash value index (e.g., such that a hash value is computed for the particular interval). In this example, the UE may, at another particular (e.g., next) interval, identify another hash value index as an index of the other particular interval of the set of M intervals, and may update (i.e., reconfigure) the hash function based at least in part on the other hash value index (e.g., such that another hash value is computed for the other particular interval). In this example, a location of one candidate may be determined based at least in part on the hash value, while a location of another candidate may be determined based at least in part on the other hash value.

In this example aspect, the UE may restart the hash function at a next periodicity. For example, at a first interval of a given periodicity (e.g., after an $M^{th}$ interval in a preceding periodicity), the UE may restart the hash function such that the hash value is reset to an initial hash value (e.g., a hash value computed based at least in part on $Y_{p,-1}$). The UE may, at a next interval of the periodicity, identify a hash value index as an index of the next interval, may configure the hash function based at least in part on the hash value index, and may update the hash function in the manner described above.

As a particular example associated with this example aspect, an interval can be defined as a slot (e.g., including 14 consecutive symbols, N=14), and the periodicity can be defined as a frame including 10 slots (M=10). Here, the UE may identify a hash value index as an index of a slot of the frame and may configure the hash function based at least in part on the index of the slot. In this example, the UE may update the hash function at each of the subsequent slots of the frame (e.g., based at least in part on indices of the slots), and may restart the hash function at a subsequent frame (i.e., at the end of the periodicity).

As another particular example associated with this example aspect, an interval can be defined as a symbol (N=1), and the periodicity can be defined as a frame including 140 symbols (M=140). Here, the UE may identify a hash value index as an index of a symbol of the frame and may configure the hash function based at least in part on the index of the symbol of the frame. In this example, the UE may update the hash function at each of the subsequent symbols of the frame (e.g., based at least in part on indices of the symbols), and may restart the hash function at a subsequent frame (i.e., at the end of the periodicity).

As another particular example associated with this example aspect, an interval can be defined as a symbol (N=1), and the periodicity can be defined as a slot including 14 symbols (M=14). Here, the UE may identify a hash value index as an index of a symbol of the slot and may configure the hash function based at least in part on the index of the symbol of the slot. In this example, the UE may update the hash function at each of the subsequent symbols of the slot (e.g., based at least in part on indices of the symbols), and may restart the hash function at a subsequent slot (i.e., at the end of the periodicity).

In another example aspect, the UE may identify the hash value index based at least in part on an index of a search space set occasion, of a plurality of search space set occasions associated with a search space set index, within a periodicity. Here, the search space set index may be associated with a search space set associated with a CORESET. A search space set occasion is defined by a number of consecutive symbols configured by a search space set start symbol bitmap and a number of consecutive symbols corresponding to a time duration of the CORESET.

In this example aspect, the periodicity may be defined as a set of N consecutive symbols. In some aspects, the UE may receive information that identifies N from a network device associated with the NR network. Additionally, or alternatively, the UE may store the information that identifies N (e.g., N may be predefined or preconfigured on the UE).

Further, in this example aspect, the UE may receive information that identifies a starting symbol of a first periodicity from a network device associated with the NR network. Additionally, or alternatively, the UE may store the information that identifies the starting symbol of the first interval of the first periodicity (e.g., the starting symbol may be predefined or preconfigured on the UE). Here, the first periodicity may be an initial periodicity that starts within or after a particular frame that is known to or can be readily identified by the UE, such as system frame number 0.

Further, in this example aspect, the UE may update the hash function at each search space set occasion of the plurality of search space set occasions associated with the search space set index. For example, the UE may identify a hash value index as an index of a particular search space set occasion (i.e., one of the plurality of search space set occasions associated with the search space set index), and may configure the hash function based at least in part on the hash value index (e.g., such that a hash value is computed for the particular search space set occasion). In this example, the UE may, at another particular (e.g., next) search space set occasion of the plurality of search space set occasions associated with the search space set index, identify another hash value index as an index of the other search space set occasion. The UE may then update (i.e., reconfigure) the hash function based at least in part on the other hash value index (e.g., such that another hash value is computed for the other particular search space set occasion). In this example, a location of a one candidate may be determined based at least in part on the hash value, while a location of another candidate may be determined based at least in part on the other hash value.

In this example aspect, the UE may restart the hash function at a next periodicity. For example, at a first search space set occasion, of a plurality of search space set occasions associated with the search space set index, within a periodicity, the UE may restart the hash function such that the hash value is reset to an initial hash value (e.g., a hash value computed based at least in part on $Y_{p,-1}$). The UE may, at a next search space set occasion of the periodicity, identify a hash value index as an index of the next search space set occasion, may configure the hash function based at least in part on the hash value index, and may update the hash function in the manner described above.

Further, in this example aspect, the UE may determine an alternate index of the hash value based at least in part on information that identifies a maximum number of hash values (e.g., preconfigured on the UE, configured by the base station, and/or the like). In such a case, the UE may update or restart the hash function based at least in part on the alternate index of the hash value.

In this example aspect, two or more search space set occasions, of the plurality of search space set occasions, may be associated with the same search space set index and may start from a same symbol in the periodicity. In such a case, the UE may identify a same hash value index for each of the at least two search space set occasions.

Further, in this example aspect, two or more search space set occasions, of the plurality of search space set occasions, may be associated with different search space set indices that are associated with the same control resource set index and may start from a same symbol in the periodicity. In such a case, the UE may identify the hash value index by selecting one of at least two indices corresponding to the two or more search space set occasions. For example, the UE may select the hash value index based at least in part on a search space set index associated with one of the two or more search space set occasions (e.g., a smallest search space set index), based at least in part on an index value associated with one of the at least two search space set occasions (e.g., a largest index value), and/or the like.

In another example aspect, the UE may identify the hash value index based at least in part on an index of a search space set occasion, of a plurality of search space set occasions associated with a plurality of search space set indices, within a periodicity. Here, the plurality of search space set indices may be associated with a CORESET index of a CORESET associated with multiple search space sets.

In this example aspect, the periodicity may be defined as a set of N consecutive symbols. In some aspects, the UE may receive information that identifies N from a network device associated with the NR network. Additionally, or alternatively, the UE may store the information that identifies N (e.g., N may be predefined or preconfigured on the UE).

Further, in this example aspect, the UE may receive information that identifies a starting symbol of a first periodicity from a network device associated with the NR network. Additionally, or alternatively, the UE may store the information that identifies the starting symbol of the first interval of the first periodicity (e.g., the starting symbol may be predefined or preconfigured on the UE). Here, the first periodicity may be an initial periodicity that starts within or after a particular frame that is known to or can be readily identified by the UE, such as system frame number 0.

In this example aspect, the UE may update the hash function at each search space set occasion of the plurality of search space set occasions associated with the plurality of search space set indices. For example, the UE may identify a hash value index as an index of a particular search space set occasion (i.e., one of the plurality of search space set occasions associated with the plurality of search space set indices), and may configure the hash function based at least in part on the hash value index (e.g., such that a hash value is computed for the particular search space set occasion). In this example, the UE may, at another particular (e.g., next) search space set occasion of the plurality of search space set occasions associated with the plurality of search space set indices, identify another hash value index as an index of the other search space set occasion. The UE may then update (i.e., reconfigure) the hash function based at least in part on the other hash value index (e.g., such that another hash value is computed for the other particular search space set occasion). In this example, a location of a one candidate may be determined based at least in part on the hash value, while a location of another candidate may be determined based at least in part on the other hash value.

Further, in this example aspect, the UE may restart the hash function at a next periodicity. For example, at a first search space set occasion, of a plurality of search space set occasions associated with the plurality of search space set indices, within a periodicity, the UE may restart the hash function such that the hash value is reset to an initial hash value (e.g., a hash value computed based at least in part on $Y_{p,-1}$). The UE may, at a next search space set occasion of the periodicity, identify a hash value index as an index of the next search space set occasion, may configure the hash function based at least in part on the hash value index, and may update the hash function in the manner described above.

Further, in this example aspect, the UE may determine an alternate index of the hash value that is determined based at least in part on information that identifies a maximum number of hash values (e.g., preconfigured on the UE, configured by the base station, and/or the like). In such a case, the UE may update or restart the hash function based at least in part on the alternate index of the hash value.

In this example aspect, two or more search space set occasions, of the plurality of search space set occasions, may be associated with the CORESET and may start from a same symbol in the periodicity. In such a case, the UE may identify a same hash value index for each of the at least two search space set occasions.

As a particular example associated with this example aspect, the periodicity can be defined as a frame containing 140 symbols (e.g., N=140). Here, the UE may identify a hash value index as an index of a search space set occasion, of a plurality of search space set occasions associated with a plurality of search space set indices, within the frame. The plurality of search space set indices is associated with a CORESET index. Here, the UE may configure the hash function based at least in part on the index of the search space set occasion. In this example, the UE may update the hash function at each subsequent search space set occasion, of a plurality of search space set occasions associated with the plurality of search space set indices, within the frame, and may restart the hash function at a first search space set occasion, of a plurality of search space set occasions associated with a plurality of search space set indices, within a subsequent frame.

As another particular example associated with this example aspect, the periodicity can be defined as a slot (e.g., 14 symbols, N=14). Here, the UE may identify a hash value index as an index of a search space set occasion, of a plurality of search space set occasions associated with a plurality of search space set indices, within the slot. The plurality of search space set indices is associated with a CORESET index. Here, the UE may configure the hash function based at least in part on the index of the search space set occasion. In this example, the UE may update the hash function at each subsequent search space set occasion, of a plurality of search space set occasions associated with the plurality of search space set indices, within the slot, and may restart the hash function at a first search space set occasion, of a plurality of search space set occasions associated with a plurality of search space set indices, within a subsequent slot.

As indicated above, FIG. 9 is provided as an example. Other examples are possible and may differ from what was described with respect to FIG. 9.

Figure 10:
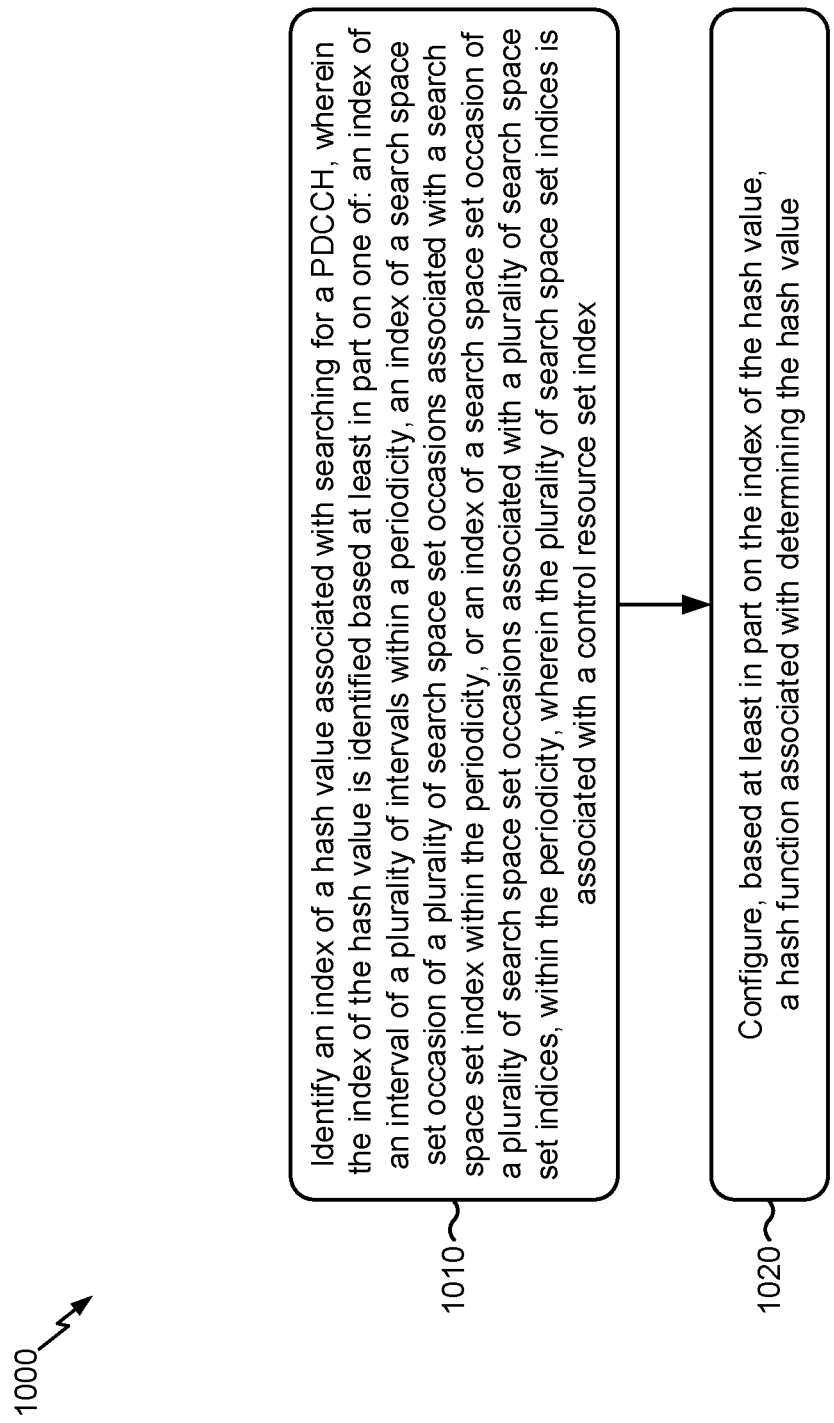
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Process 1000 may, in one example, illustrate a method for wireless communication performed by a UE. Example process 1000 is an example where a UE (e.g., UE 120) identifies a hash value index for a hash function associated with identifying a location of a candidate in which PDCCH may be received in a NR network.

As shown in FIG. 10, in some aspects, process 1000 may include identifying an index of a hash value associated with searching for a PDCCH, wherein the index of the hash value is identified based at least in part on one of: an index of an interval of a plurality of intervals within a periodicity, an index of a search space set occasion of a, plurality of search space set occasions associated with a search space set index, within the periodicity, an index of a search space set occasion, of a plurality of search space set occasions associated with a plurality of search space set indices, within the periodicity, wherein the plurality of search space set indices is associated with a control resource set index (block 1010). For example, the UE (e.g., using receive processor 258, controller/processor 280, and/or the like) may identify an index of a hash value associated with searching for a PDCCH, in the manner described above.

As shown in FIG. 10, in some aspects, process 1000 may include configuring, based at least in part on the index of the hash value, a hash function associated with determining the hash value (block 1020). For example, the UE (e.g., using receive processor 258, controller/processor 280, and/or the like) may configure, based at least in part on the index of the hash value, a hash function associated with determining the hash value, as described above.

Process 1000 may include additional aspects, such as any single aspect or any combination of aspects described below.

In some aspects, when the index of the hash value is identified based at least in part on the index of the interval, the hash function is updated at another interval of the plurality of intervals. Here, the hash function is updated based at least in part on an updated index of the hash value identified based at least in part on an index of the other interval. In some aspects, an interval may be defined as a set of N (N≥1) consecutive symbols.

In some aspects, when the index of the hash value is identified based at least in part on the index of the interval, the hash function is restarted at a first interval of a next periodicity.

In some aspects, when the index of the hash value is identified based at least in part on the index of the interval, the periodicity includes M (M≥1) intervals.

In some aspects, when the index of the hash value is identified based at least in part on the index of the interval, each interval, of the plurality of intervals, includes N (N≥1) consecutive symbols.

In some aspects, when the index of the hash value is identified based at least in part on the index of the interval, information that identifies a starting symbol of a first interval of a first periodicity is received from a network device or is stored by the UE. In some aspects, the first periodicity is an initial periodicity that starts within or after system frame number 0.

In some aspects, a given search space set occasion is defined by a number of consecutive symbols configured by a search space set start symbol bitmap and a number of consecutive symbols corresponding to a time duration of a control resource set.

In some aspects, when the index of the hash value is identified based at least in part on the index of the search space set occasion of the plurality of search space set occasions associated with the search space set index, the hash function is updated at another search space set occasion of the plurality of search space set occasions associated with the search space set index. Here, the hash function is updated based at least in part on an updated index of the hash value identified based at least in part on an index of the other search space set occasion.

In some aspects, when the index of the hash value is identified based at least in part on the index of the search space set occasion of the plurality of search space set occasions associated with the search space set index, the hash function is restarted at a first search space set occasion of a plurality of search space set occasions in a next periodicity.

In some aspects, when the index of the hash value is identified based at least in part on the index of the search space set occasion of the plurality of search space set occasions associated with the search space set index, the periodicity includes N (N≥1) consecutive symbols. In some aspects, information that identifies N is received from a network device or is stored by the UE.

In some aspects, when the index of the hash value is identified based at least in part on the index of the search space set occasion of the plurality of search space set occasions associated with the search space set index, information that identifies a starting symbol of a first periodicity is received from a network device or is stored by the UE. In some aspects, the first periodicity is an initial periodicity that starts within or after system frame number 0.

In some aspects, when the index of the hash value is identified based at least in part on the index of the search space set occasion of the plurality of search space set occasions associated with the search space set index, and when at least two search space set occasions, of the plurality of search space set occasions, are associated with the same search space set index and start from a same symbol in the periodicity, a same index of the hash value is identified for each of the at least two search space set occasions.

In some aspects, when the index of the hash value is identified based at least in part on the index of the search space set occasion of the plurality of search space set occasions associated with the search space set index, and when at least two search space set occasions, of the plurality of search space set occasions, are associated with different search space set indices that are associated with the same control channel set index and start from a same symbol in the periodicity, the index of the hash value is identified based at least in part on selecting one of at least two indices corresponding to the at least two search space set occasions. In some aspects, the index of the hash value is selected based at least in part on a search space set index associated with one of the at least two search space set occasions. In some aspects, the index of the hash value is selected based at least in part on an index value associated with one of the at least two search space set occasions.

In some aspects, when the index of the hash value is identified based at least in part on the index of the search space set occasion of the plurality of search space set occasions associated with the search space set index, an alternate index of the hash value is determined based at least in part on information that identifies a maximum number of hash values. Here, the hash function is updated or restarted based at least in part on the alternate index of the hash value.

In some aspects, when the index of the hash value is identified based at least in part on the index of the search space set occasion of the plurality of search space set occasions associated with the plurality of search space set indices (the plurality of search space set indices being associated with the control channel index), the hash function is updated at another search space set occasion of the plurality of search space set occasions associated with the plurality of search space set indices. Here, the hash function is updated based at least in part on an updated index of the hash value identified based at least in part on an index of the other search space set occasion.

In some aspects, when the index of the hash value is identified based at least in part on the index of the search space set occasion of the plurality of search space set occasions associated with the plurality of search space set indices (the plurality of search space set indices being associated with the control channel index), the hash function is restarted at a first search space set occasion of a plurality of search space set occasions associated with the plurality of search space set indices within in a next periodicity.

In some aspects, when the index of the hash value is identified based at least in part on the index of the search space set occasion of the plurality of search space set occasions associated with the plurality of search space set indices (the plurality of search space set indices being associated with the control channel index), the periodicity includes N (N≥1) consecutive symbols. In some aspects, information that identifies N is received from a network device or is stored by the UE.

In some aspects, when the index of the hash value is identified based at least in part on the index of the search space set occasion of the plurality of search space set occasions associated with the plurality of search space set indices (the plurality of search space set indices being associated with the control channel index), information that identifies a starting symbol of a first periodicity is received from a network device or is stored by the UE. In some aspects, the first periodicity is an initial periodicity that starts within or after system frame number 0.

In some aspects, when the index of the hash value is identified based at least in part on the index of the search space set occasion of the plurality of search space set occasions associated with the plurality of search space set indices (the plurality of search space set indices being associated with the control channel index), and when at least two search space set occasions, of the plurality of search space set occasions, are associated with a same control resource set and start from a same symbol in the periodicity, a same index of the hash value is identified for each of the at least two search space set occasions.

In some aspects, when the index of the hash value is identified based at least in part on the index of the search space set occasion of the plurality of search space set occasions associated with the plurality of search space set indices (the plurality of search space set indices being associated with the control channel index), an alternate index of the hash value is determined based at least in part on information that identifies a maximum number of hash values. Here, the hash function is updated or restarted based at least in part on the alternate index of the hash value.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

In an implementation in which simplicity and/or compatibility with a legacy system (e.g., an LTE system) is desired or preferred, identification of the hash value index based at least in part on an index of an interval of a plurality of intervals within a periodicity may be used. FIG. 11 is a diagram illustrating an example process 1100 performed, for example, by a UE, in which a UE (e.g., UE 120) identifies a hash value index for a hash function, associated with identifying a location of a candidate in which PDCCH may be received, based at least in part on an index of an interval of a plurality of intervals within a periodicity. In some examples, the hash function, the hash value index, and the interval of the plurality of intervals within a periodicity can be similar to those described elsewhere in this disclosure, for example, with reference to FIG. 8, FIG. 9, and FIG. 10. Process 1100 may, in one example, illustrate a method for wireless communication performed by a UE.

As shown in FIG. 11, in some aspects, process 1100 may include identifying an index of a hash value, associated with searching for a PDCCH, based at least in part on an index of an interval of a plurality of intervals within a periodicity (block 1110). For example, the UE (e.g., using receive processor 258, controller/processor 280, and/or the like) may identify an index of a hash value, associated with searching for a PDCCH, based at least in part on an index of an interval of a plurality of intervals within a periodicity, as described above in some aspects, for example, with reference to block 1010 of FIG. 10.

As shown in FIG. 11, in some aspects, process 1100 may include configuring, based at least in part on the index of the hash value, a hash function associated with determining the hash value (block 1120). For example, the UE (e.g., using receive processor 258, controller/processor 280, and/or the like) may configure, based at least in part on the index of the hash value, a hash function associated with determining the hash value, as described above in some aspects, for example, with reference to block 1020 of FIG. 10.

Process 1100 may include additional aspects, such as any single aspect or any combination of aspects described below.

In some aspects, the hash function is updated at another interval of the plurality of intervals. Here, the hash function is updated based at least in part on an updated index of the hash value identified based at least in part on an index of the other interval. In some aspects, an interval may be defined as a set of N (N≥1) consecutive symbols.

In some aspects, the hash function is restarted at a first interval of a next periodicity.

In some aspects, the periodicity includes M (M≥1) intervals.

In some aspects, each interval, of the plurality of intervals, includes N (N≥1) consecutive symbols.

In some aspects, information that identifies a starting symbol of a first interval of a first periodicity is received from a network device or is stored by the UE. In some aspects, the first periodicity is an initial periodicity that starts within or after system frame number 0.

In some aspects, a given search space set occasion is defined by a number of consecutive symbols configured by a search space set start symbol bitmap and a number of consecutive symbols corresponding to a time duration of a control resource set.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying an index of a hash value, associated with searching for a physical downlink control channel (PDCCH), based at least in part on an index of an interval of a plurality of intervals within a periodicity;
   configuring, based at least in part on the index of the hash value, a hash function associated with determining the hash value that can be used to identify a candidate location for PDCCH in a particular search space set; and
   wherein information that identifies a starting symbol of a first interval of a first periodicity is received from a network device or is stored by the UE.

2. The method of claim 1, wherein the hash function is updated at another interval of the plurality of intervals based at least in part on an updated index of the hash value identified based at least in part on an index of the other interval.

3. The method of claim 1, wherein the hash function is restarted at a first interval of a next periodicity.

4. The method of claim 1, wherein the periodicity includes M (M≥1) intervals.

5. The method of claim 1, wherein each interval of the plurality of intervals includes N (N≥1) consecutive symbols.

6. The method of claim 1, wherein the first periodicity is an initial periodicity that starts within or after system frame number 0.

7. The method of claim 1, wherein a given search space set occasion is defined by a number of consecutive symbols configured by a search space set start symbol bitmap and a number of consecutive symbols corresponding to a time duration of a control resource set.

8. A user equipment (UE) for wireless communication, comprising:
   memory; and
   one or more processors coupled to the memory, the memory and the one or more processors configured to:
      identify an index of a hash value, associated with searching for a physical downlink control channel (PDCCH), based at least in part on an index of an interval of a plurality of intervals within a periodicity;
      configure, based at least in part on the index of the hash value, a hash function associated with determining the hash value that can be used to identify a candidate location for PDCCH in a particular search space set; and
      wherein information that identifies a starting symbol of a first interval of a first periodicity is received from a network device or is stored by the UE.

9. The UE of claim 8, wherein the one or more processors are further configured to update the hash function at another interval of the plurality of intervals based at least in part on an updated index of the hash value identified based at least in part on an index of the other interval.

10. The UE of claim 8, wherein the hash function is restarted at a first interval of a next periodicity.

11. The UE of claim 8, wherein the periodicity includes M (M≥1) intervals.

12. The UE of claim 8, wherein each interval of the plurality of intervals includes N (N≥1) consecutive symbols.

13. The UE of claim 8, wherein the first periodicity is an initial periodicity that starts within or after system frame number 0.

14. The UE of claim 8, wherein a given search space set occasion is defined by a number of consecutive symbols configured by a search space set start symbol bitmap and a number of consecutive symbols corresponding to a time duration of a control resource set.

15. A non-transitory computer-readable medium storing one or more instructions for wireless communication, the one or more instructions comprising:
   one or more instructions that, when executed by one or more processors of a user equipment (UE), cause the one or more processors to:
      identify an index of a hash value, associated with searching for a physical downlink control channel (PDCCH), based at least in part on an index of an interval of a plurality of intervals within a periodicity;
      configure, based at least in part on the index of the hash value, a hash function associated with determining the hash value that can be used to identify a candidate location for PDCCH in a particular search space set; and
      wherein, information that identifies a starting symbol of a first interval of a first periodicity is received from a network device or is stored by the UE.

16. The non-transitory computer-readable medium of claim 15, wherein the one or more instructions further cause the one or more processors to update the hash function at another interval of the plurality of intervals based at least in part on an updated index of the hash value identified based at least in part on an index of the other interval.

17. The non-transitory computer-readable medium of claim 15, wherein the hash function is restarted at a first interval of a next periodicity.

18. The non-transitory computer-readable medium of claim 15, wherein the periodicity includes M (M≥1) intervals.

19. The non-transitory computer-readable medium of claim 15, wherein each interval of the plurality of intervals includes N (N≥1) consecutive symbols.

20. The non-transitory computer-readable medium of claim 15, wherein the first periodicity is an initial periodicity that starts within or after system frame number 0.

21. An apparatus for wireless communication, comprising:
   means for identifying an index of a hash value, associated with searching for a physical downlink control channel (PDCCH), based at least in part on an index of an interval of a plurality of intervals within a periodicity;
   means for configuring, based at least in part on the index of the hash value, a hash function associated with determining the hash value that can be used to identify a candidate location for PDCCH in a particular search space set; and
   wherein information that identifies a starting symbol of a first interval of a first periodicity is received from a network device or is stored by the apparatus.

22. The apparatus of claim 21 further comprising means for updating the hash function at another interval of the plurality of intervals based at least in part on an updated index of the hash value identified based at least in part on an index of the other interval.

23. The apparatus of claim 21, wherein the hash function is restarted at a first interval of a next periodicity.

24. The apparatus of claim 21, wherein the periodicity includes M (M≥1) intervals.

25. The apparatus of claim 21, wherein each interval of the plurality of intervals includes N (N≥1) consecutive symbols.

26. The apparatus of claim 21, wherein the first periodicity is an initial periodicity that starts within or after system frame number 0.

* * * * *